United States Patent [19]
Kitamura

[11] Patent Number: 5,306,137
[45] Date of Patent: Apr. 26, 1994

[54] APPARATUS FOR MOLDING PRODUCTS

[76] Inventor: Hiroshi Kitamura, 1222, Kawada-cho, Utsunomiya-shi, Tochigi-ken, Japan

[21] Appl. No.: 731,848

[22] Filed: Jul. 17, 1991

[30] Foreign Application Priority Data

Jul. 16, 1990 [JP] Japan .................................. 2-187504

[51] Int. Cl.$^5$ ...................... B28B 21/22; E04G 13/02
[52] U.S. Cl. .................................. 425/595; 425/435; 425/451; 425/451.7; 425/451.9; 249/48; 249/192; 249/196; 249/219.1
[58] Field of Search .................. 425/595, 435, 451.9, 425/451.7, 451; 249/47, 192, 196, 219.1, 165, 166, 163, 167, 168, 169, 48

[56] References Cited

U.S. PATENT DOCUMENTS

| | | | |
|---|---|---|---|
| 1,687,340 | 10/1928 | Little | 425/451.9 |
| 3,865,534 | 2/1975 | Mori | 425/451.9 |
| 3,877,674 | 4/1975 | Cerutti | 249/196 |
| 4,194,717 | 3/1980 | Easton et al. | 249/196 |
| 4,416,440 | 11/1983 | Bowman et al. | 249/165 |
| 4,484,880 | 11/1984 | Schwarz | 425/451.9 |
| 4,842,506 | 6/1989 | Coutier | 425/451.9 |

FOREIGN PATENT DOCUMENTS

| | | |
|---|---|---|
| 1065769 | 8/1957 | Fed. Rep. of Germany . |
| 57-44447 | 9/1982 | Japan . |
| 57-45645 | 9/1982 | Japan . |
| 58-49372 | 11/1983 | Japan . |

*Primary Examiner*—Khanh Nguyen
*Attorney, Agent, or Firm*—Weintraub, DuRoss & Brady

[57] ABSTRACT

A formwork, a device for clamping the formwork and a mechanism for actuating the clamping are taught. The formwork includes two molds, which mount together. The clamping device secures the mounted molds and allows the formwork to operate. The clamping device includes a movable member and a tension member, which locks the movable member to protruding sections of each mold. This clamping device is duplicated along the length of the protruding sections. The mechanism for actuating the clamping exerts force upon the movable member to secure it between the tension member and the protruding sections. This same mechanism can withdraw the movable member from the clamp. By this, the clamping is accomplished and a more efficient formwork is achieved.

2 Claims, 8 Drawing Sheets

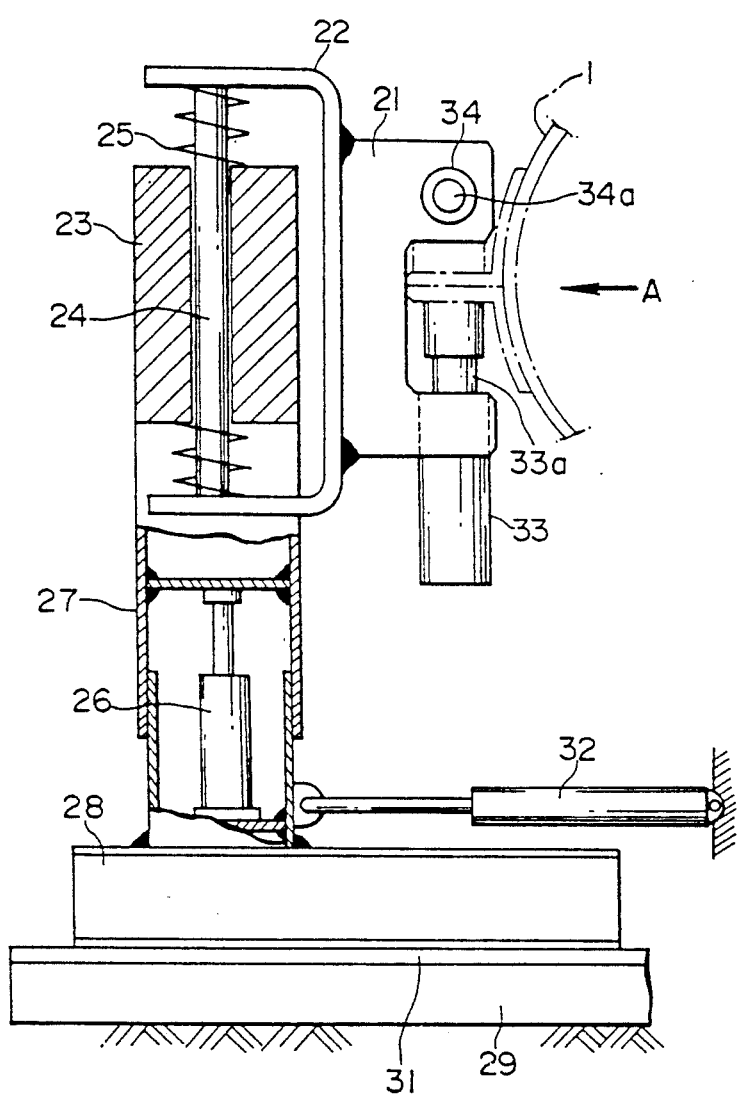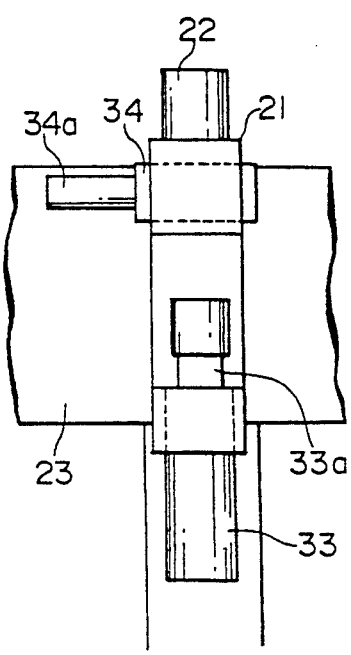

APPARATUS FOR MOLDING PRODUCTS

BACKGROUND OF THE INVENTION

1. Field of the Invention

The present invention relates to an apparatus for molding products. More particularly, the present invention relates to a formwork, a means for clamping the formwork and a means for actuating the clamping of the formwork.

2. Description of the Prior Art

Techniques for clamping a formwork are described in Japanese Patent Publication Nos. 57-44447, 57-45645 and 58-49372. In these techniques, angle members are secured to joining portions of a pair of two molds, constituting a formwork, thereby to form protruding pieces. The pair of protruding pieces are clamped to each other by a number of wedges disposed along a longitudinal direction of the formwork. The number of wedges are connected in series. By pulling one end of the series of wedges in the longitudinal direction of the formwork, the wedges are moved as a unit so that the protruding pieces are clamped at each wedge portion along the longitudinal direction of the formwork.

However, in these techniques, both the action of clamping the formwork and the action of maintaining the clamped condition are performed by the wedges. As a result, the force exerted by the wedges on both the protruding pieces, to bring the protruding pieces into engagement, becomes necessarily large. Therefore, a large force is required to pull the wedges, since the frictional force at the wedge surfaces is high. Accordingly, since an expansion is caused in the member connecting the wedges, the intervals of the wedges and the intervals of positions at which the wedges impart the forces are deviated and not coincident with each other. Thus, drawbacks have been encountered in which it becomes impossible to clamp uniformly along the longitudinal direction. At the same time, the correction of the wedge intervals must be made while correcting relative positions with respect to other wedges, which requires many man-hours.

Furthermore, the direction of the pulling of the wedges and the direction of force exerted to bring the pair of protruding pieces into engagement are different from each other by 90 degrees. As a result, since the turn of the direction of the force is effected on the surfaces of the wedges, the pulling force of the wedges is greatly reduced.

Moreover, in order to transmit the pulling force across the series of the wedges, it is necessary to connect the wedges throughout the formwork continuosly in the longitudinal direction by a member. Therefore, it is necessary to form a hole in a circular ring (a so-called "tire") for rotating the formwork, or in a protruding portion of a reinforcing rib or the like. Thus, the drawbacks are the inefficiency in wasted man-hours and the degraded strength of the ring or rib.

SUMMARY OF THE INVENTION

It is an object of the present invention to provide an apparatus for use in molding products, comprising a formwork, means for clamping the formwork and a means for actuating the clamping, which is capable of eliminating the drawbacks in the prior art techniques by clamping the formwork at a plurality of positions, each position independent of the other positions, along a longitudinal direction.

The means for clamping or the formwork clamping mechanism secures together an lower mold and a upper mold, the molds having respectively a plurality of first and second protruding pieces, the lower and upper molds constituting the formwork.

The formwork clamping mechanism comprises:

(a) a plurality of pairs of clamping force applying portions formed separately along joining edges of the formwork and respectively at opposite sides of the first and second protruding pieces, the upper mold and lower mold being clamped by applying forces opposing to each other to the pairs of clamping force applying portions;

(b) a plurality of tension members formed on the first protruding piece along the joining edges of the formwork, the tension members protruding vertically and penetrating through holes respectively formed in the second protruding piece, each of the tension members having a head portion at an end thereof;

(c) a plurality of lock pieces each removably engaging between a lower surface of the head portion and an upper surface of the second protruding piece, each lock piece maintaining the clamped condition when positioned at an engaging position;

(d) a plurality of engaging force applying portions formed on each of the lock pieces independently of the other lock pieces to move the lock piece to an engaging position between the lower surface of the head portion and the upper surface of the second protruding piece when a force is applied thereto; and (e) a plurality of disengaging force applying portions formed on each of the lock pieces independently of the other lock pieces to move the lock piece to a disengaged position when a force is applied thereto.

Furthermore, the operating mechanism for the formwork clamping mechanism comprises:

(a) a plurality of C-shaped frames each having opposite ends respectively facing the lower and upper surfaces of the first and second protruding pieces formed respectively on the pair of molds constituting the formwork;

(b) a first pressing machine disposed at one end of each of the C-shaped frames for applying clamping forces to the clamping force applying portions respectively formed at the lower and upper surfaces of the first and second protruding pieces thereby to secure the C-shaped frame to both the first and second protruding pieces;

(c) a second pressing machine supported by each of the C-shaped frames for moving the lock piece provided on the upper surface of the second protruding piece to the engaging position thereby to maintain the clamped condition of both the first and second protruding pieces;

(d) a beam extending along a longitudinal direction of the formwork for supporting the plurality of C-shaped frames; and (e) a moving machine for moving the beam towards the formwork.

In the formwork clamping mechanism, when applying the clamping forces which are opposing to each other to bring both the protruding pieces into contact with each other to the clamping force applying portions of both the protruding pieces, the pair of molds confronting each other are clamped. In this condition, the tension member having one end fixed to the first protruding piece penetrates through the second protruding piece so that the head portion of the tension member protrudes beyond the upper surface of the second protruding piece. Next, when the engaging force is applied to the engaging force applying portion in a horizontal direction, the lock piece is moved to engage between the lower surface of the head portion of the tension member and the upper surface of the second protruding piece thereby to maintain the clamped condition. In this manner, the force to clamp the formwork and the force to maintain the clamped condition are applied respectively to separate and different members.

Furthermore, the applying of forces to a plurality of clamping force applying portions and to a plurality of engaging force applying portions disposed along the joining edges of the formwork are respectively carried out independently and simultaneously at the portions along the joining edges of the formwork. On the other hand, in releasing the clamped pair of molds, the same forces as the clamping forces are applied to the clamping force applying portions in the same manner as to clamp the molds. In this condition, when the disengaging force is applied to the disengaging force applying portion, the lock piece is disengaged from the head portion of the tension member and the clamping maintaining force is released. Then, by releasing the same forces as the clamping forces, the pair of molds become free and can be separated.

In operating the operation mechanism, the beam is advanced towards the first and second protruding pieces by the moving device, so that the opposite ends of the C-shaped frame confront respectively the lower and upper surface of both the protruding pieces. Then, by the first pressing machine of the C-shape frame, the clamping forces are applied to press both the protruding pieces against each other thereby to clamp the formwork and at the same time to fix the C-shaped frame to both the protruding pieces. Both the protruding pieces are urged to move close to each other, and the confronting pair of molds are clamped.

Subsequently, the lock piece is pressed in the horizontal direction by the second pressing machine to engage the lock piece between the head of the tension member and the second protruding piece. The reaction force of this pressing is received by both the protruding pieces through the C-shaped frame. By this operation, the clamping operation is finished, and thereafter the pressing forces of the first and second pressing machines are released and the beam is moved backwardly by the moving device. Thus, the operating mechanism for the formwork clamping mechanism returns to the original non-operating position.

The present invention will become clearer with reference to the drawings, wherein like numbers refer to like parts.

BRIEF DESCRIPTION OF THE DRAWINGS

FIG. 7 is a front view partially broken of an operating mechanism.

FIG. 8 shows a C-shaped frame as viewed in the direction of arrow A in FIG. 7.

DETAILED DESCRIPTION OF THE PREFERRED EMBODIMENTS

Figure 1:
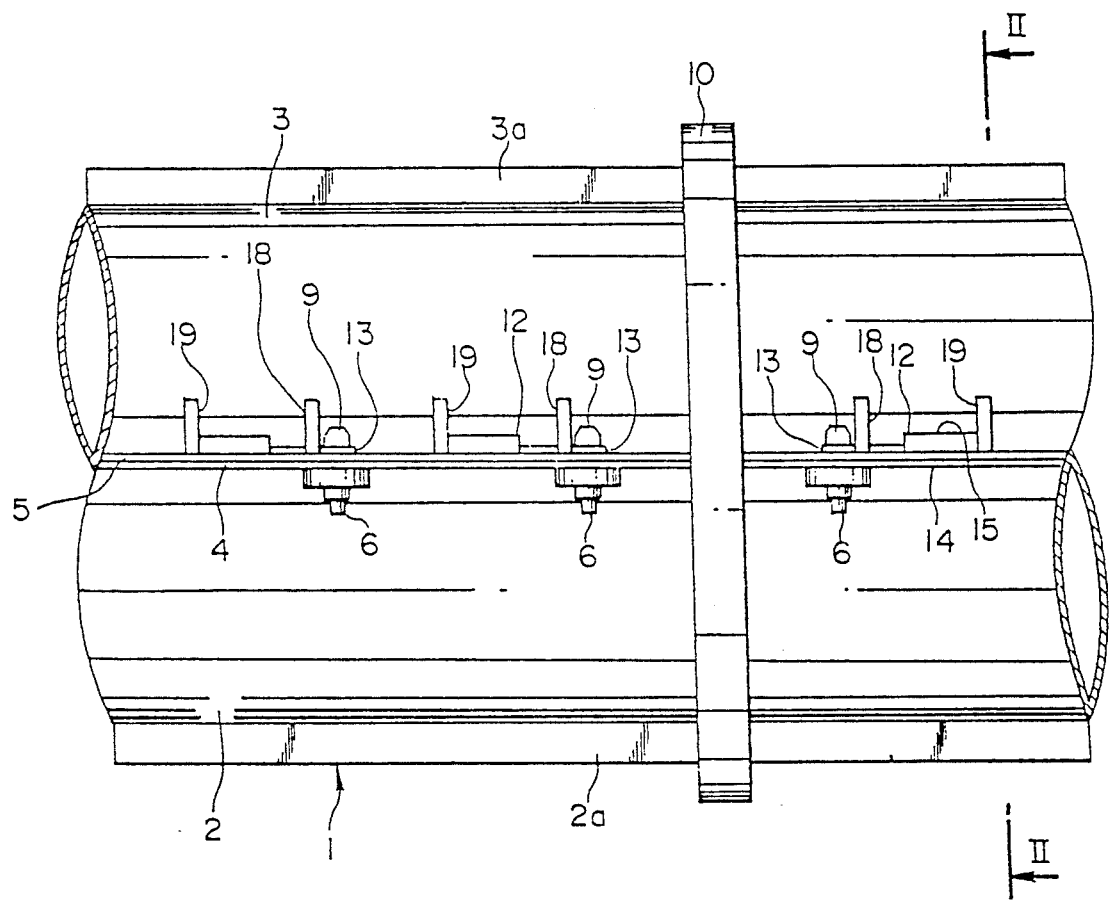
FIG. 1 is a side view of a formwork and its clamping mechanism.
Figure 2:
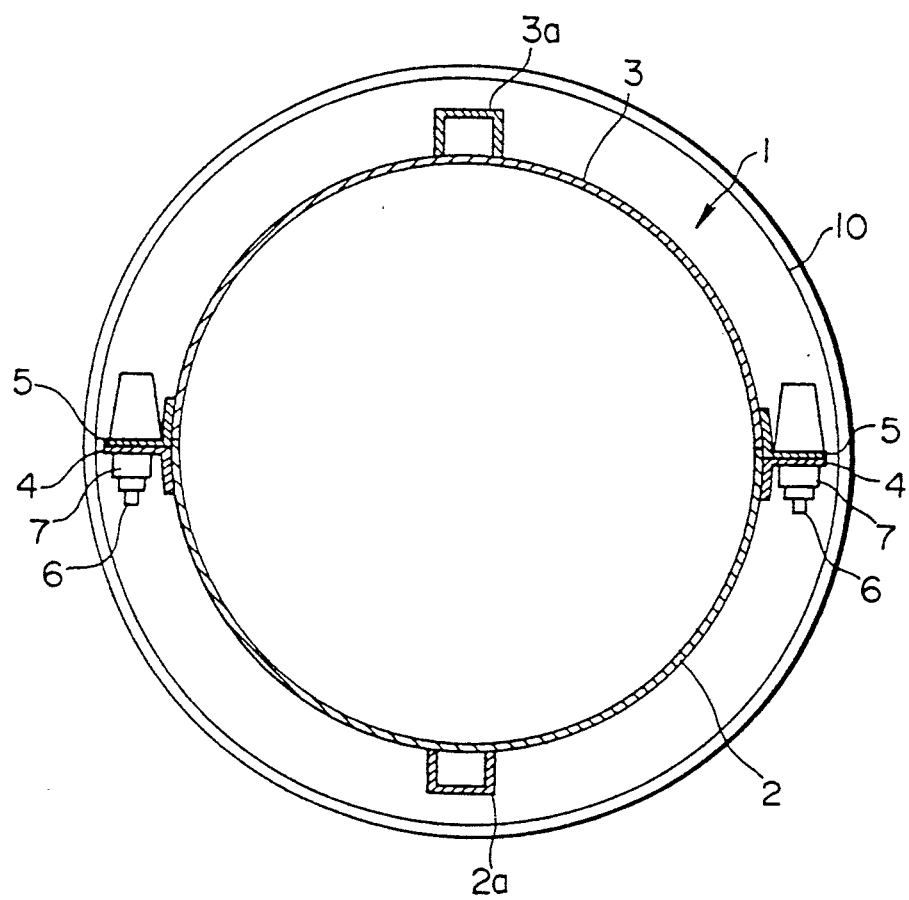
FIG. 2 is a sectional view taken along the line II—II in FIG. 1.

Referring now to FIGS. 1-6, there is shown a formwork 1 for use in centrifugal casting of a concrete product. The formwork 1 comprises a lower mold 2 and an upper mold 3. The lower mold 2 and the upper mold 3 have a semicircular cross section, the molds 2 and 3 being opposed to define the formwork 1 as a long hollow cylindrical shape, as is well known in the art.

A pair of first protruding pieces 4 is welded to the lower mold 2. The first protruding pieces 4 comprise angle members, formed in an L-shape as viewed in cross section. The first protruding pieces 4 are deployed along the outside edges of the lower mold 2.

A pair of second protruding pieces 5 is welded to the upper mold 3. The second protruding pieces 5 comprise angle members, formed in an L-shape as viewed in cross section. The second protruding pieces 5 are deployed along the outside edges of the upper mold 3.

The first protruding pieces 4 and the second protruding pieces 5 are deployed such that when the upper mold 3 is mounted upon the lower mold 2 to define the formwork 1, the first and second protruding pieces 4 and 5 abut each other. Sealing occurs between the first protruding pieces 4 and the second protruding pieces 5, and the edges of the lower mold 2 and the upper mold 3.

A ring 10 is provided around a peripheral surface of the formwork 1 to allow rotation of the formwork 1. Reinforcing members 2a and 3a are deployed at the base of the lower mold 2 and the upper mold 3. The reinforcing members 2a and 3a extend along the longitudinal length of the molds 2 and 3.

As shown in FIGS. 3-6, a plurality of apertures 4a are formed in the first protruding pieces 4. A corresponding plurality of apertures 5a are formed in the second protruding pieces 5. The apertures 4a and the corresponding apertures 5a are formed such that the abutment of the first protruding pieces 4 with the second protruding pieces 5 bring each aperture 4a into alignment with its corresponding aperture 5a. The corresponding apertures 5a have a larger diameter than the apertures 4a.

Figure 3:
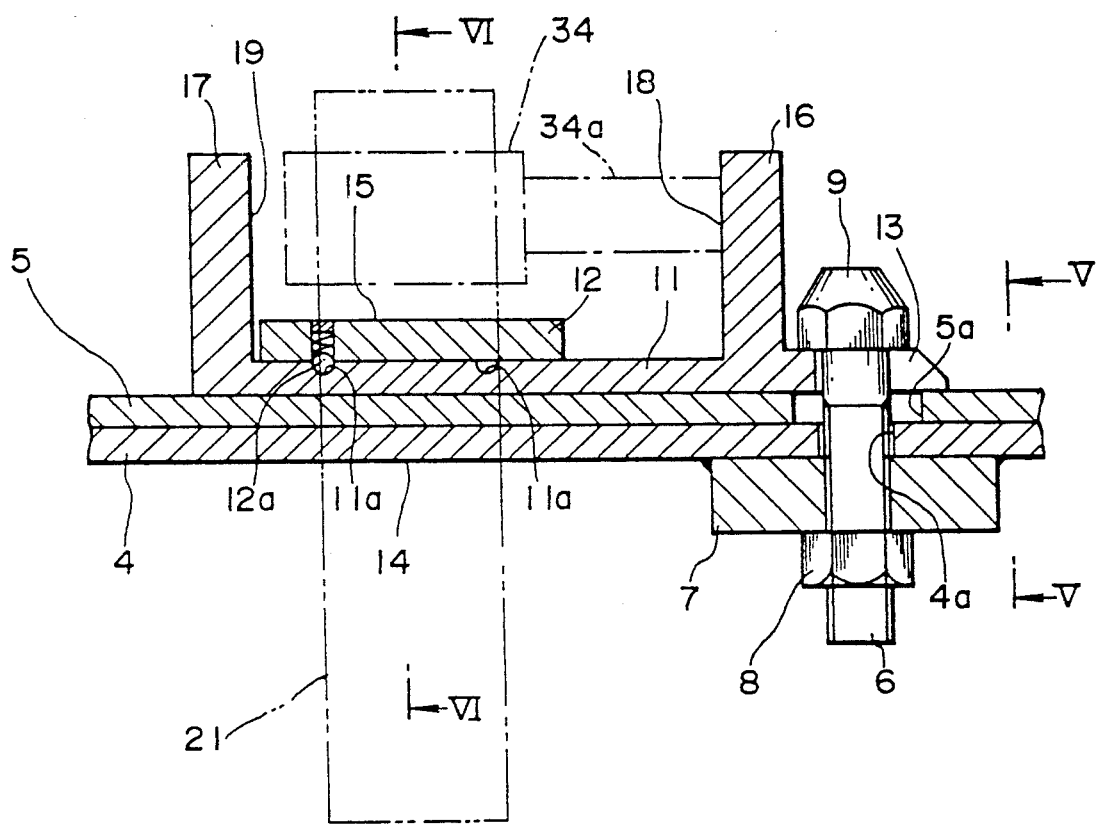
FIG. 3 is an enlarged side view of the formwork clamping mechanism of FIG. 1.
Figure 4:
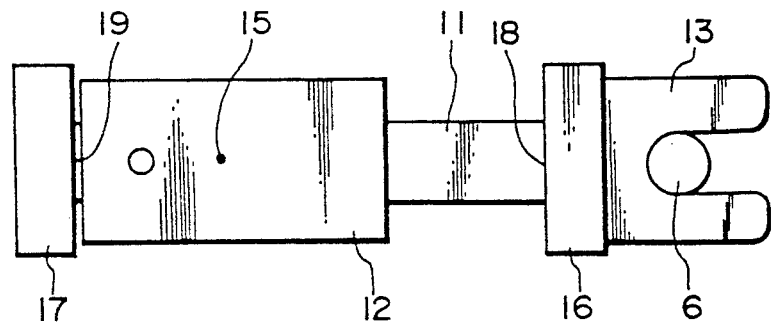
FIG. 4 is a plan view of the movable member with lock piece, and the frame member in FIG. 1.

Referring to FIG. 3, there is shown a tension member 6. The tension member 6 comprises a shaft portion having a protruding head 9 deployed at one end thereof. A male-threading (not shown) is disposed upon the shaft of the tension member 6. A plurality of plates 7 are welded along the length of the first protruding pieces 4 of the lower mold 2. Each plate 7 has a female-threaded aperture formed therein. The female-threaded aperture of each plate 7 is deployed such that it is in alignment with each aperture 4a deployed along the first protruding pieces 4 of the lower mold 2. The male threading of the tension member 6 corresponds to the female-threading of the plates 7, such that the tension member is retained thereon by the plate 7.

A plurality of movable members 11 are disposed on the upper surface of the second protruding pieces 5 of the upper mold 3. Each movable member 11 comprises a flat base, the base having a locking piece 13 integrally formed at its forward end. The locking piece 13 has a thickness matched to the distance between the lower surface of the head portion 9 of the tension member 6 and the upper surface of the second protruding piece 5. This allows the lock piece 13 to removably engage the tension member 6.

A forward upright member 16 and a rearward upright member 17 are integrally formed into the base of the movable member 11. A groove 11a is formed in the upper surface of the movable member 11. A frame member 12 is welded to the upper surface of the second protruding piece 5 and straddles the movable member 11, thus only allowing the movable member 11 to slide back and forth. A protrusion 12a biased by a spring is deployed on the frame member 12. The protrusion 12a is fitted into the groove 11a on the movable member 11 when positioned as shown in FIG. 3, thereby preventing the free movement of the movable member 11.

A clamping force applying portion or first clamp location 15 is formed on the upper surface of the frame member 12. A second clamping force applying portion or second clamp location 14 is formed on the lower surface of the first protruding piece 5, the position of the first clamp location 15 vertically corresponding with the second clamp location 14. Thus, the first protruding piece 4 and the second protruding piece 5 are clamped when pressed together. The frame member 12 has the strength to prevent deformation by the clamping force.

An engaging force applying portion 18 is located on the forward upright member 16. A disengaging force applying portion 19 is located on the rearward upright member 17. The engaging force applying portion is a position at which a pressing force is applied horizontally and forwardly so as to move the movable member 11 forward and the locking piece 13 thereof into engagement with the tension member 6. Alternately, the disengaging force applying portion 19 is a position at which a pressing force is applied horizontally and rearwardly so as to disengage the lock piece 13 from the tension member 6.

The various members shown in FIGS. 3–6, i.e. the movable member 11 and its integral parts, the tension member 6 and its integral parts, the frame member 12 and its constituent parts, as associated with the first protruding piece 4 and the second protruding piece 5 comprise a plurality of sets of members. A number of sets are deployed along the formwork 1. As can be seen in FIG. 1, the sets are independent of one another. The orientation and direction of movement towards the engaging position of the lock piece 13 in one set may be different from that in other sets. By reversing the orientation and the direction of movement of the lock piece 13, it is possible to dispose a plurality of tension members 6 at equal intervals or at predetermined intervals along the longitudinal direction of the formwork 1. This avoids interference with members of other sets.

In FIG. 1, the lock pieces 13 of the left and center sets are moved in the right hand direction to engage between the heads 9 and the upper surface of the second protruding piece 5. The lock piece 13 of the right set is moved in the left hand direction to engage in a similar manner. In this case, the tension members 6 may not necessarily be disposed at equal intervals because the mutual intervals are only determined depending on the conditions including the purpose of the formwork 1.

The operation of the locking mechanism will now be explained. When the upper mold 3 is mounted on the lower mold 2, means for clamping are applied vertically to each of the first protruding pieces 4 attached to the lower mold 2 and to each of the corresponding second protruding pieces 5 of the upper mold 3. The means for clamping contacts the movable member 11 disposed on the second protruding piece 5, as well as the first protruding piece 4 of the lower mold 2.

The means for clamping then applies an engaging force to the locking member 11 of the forward upright piece 16. The movable member 11 is advanced by the engaging force, such that the locking piece 13 is inserted between the lower surface of the head 9 of the tension member 6 and the upper surface of the second protruding piece 5, as shown in FIG. 3. If the gap between the lower surface of the head 9 and the upper surface of the second protruding piece 5 is the same size as the thickness of the lock piece 13, the engaging force may be minimal.

By slanting the lock piece 13, the movable member 11 becomes like a wedge and the engaging force becomes necessarily increased. The lock piece 13 functions, however, to maintain the clamped condition. Thus, even when the clamping force is increased by forming the lock piece 13 in the wedge shape, the rate of the increased clamping force is a part of the required clamping force. When the lock piece 13 is formed in the wedge shape, the lock piece 13 is pressed to fit between the head 9 and the second protruding piece 5. After the lock piece 13 is engaged, the clamping forces applied to the movable member 11 are released. The clamped condition of the formwork 1 is maintained by the lock piece 13. In this condition, the formwork 1 is used in a molding process of concrete or the like.

To release the clamp, clamping forces are applied to the clamping force applying portions 14 and 15. This serves to form a gap, loosening the lock piece 13. A disengaging force is applied in a rearward direction to the disengaging force applying portion 19. The movable member 11 retreats from engagement and the lock piece 13 is removed from the tension member 6. After disengagement, the clamping forces are released. The upper mold 3 can then be easily lifted from the lower mold 2. At the forward and rearward positions of the movable member 11, the protrusion 12a is fitted into one groove 11a and the other groove respectively. Accordingly, the movable member 11 is maintained at its position until a certain external force is applied. In particular, in the retreat of the movable member 11, since the movable member 11 is held at its position, it is facilitated in covering the lower mold 2 by the upper mold 3 because the head portion 9 of the tension member 6 does not strike or contact the lock piece 13.

While each set of members is independent, the operation of each set is carried out separately but simultaneously with the other sets.

Referring now to FIGS. 1–9, the operation mechanism or the means for actuating the means for clamping will be discussed.

A C-shaped frame 21 is secured to a frame 22, where the opposing ends of the frame 21 face the first and second protruding pieces 4 and 5, as shown. The frame 22 is supported by a beam 23 through a vertical bar 24.

The frame 22 is vertically movable by the vertical bar 24. The beam 23 is positioned at one side of the formwork 1 to extend in parallel to the formwork 1. Springs 25 are wound about the vertical bar 24 and compressed between the beam 23 and the frame 22 to resiliently support the C-shape frame 21 in the vertical direction. A plurality of C-shaped frames 21 are provided along the longitudinal direction of the beam 23, separately and independently. The number of C-shaped frames 21 corresponds to the number of sets, as defined previously.

The beam 23 is supported by a plurality of telescopic-type struts 27 which are expandable by a first cylinder device 26. The lower end of each strut 27 is secured to a movable table 28. The movable table 28 is mounted on a sliding table or rail 31 on a base 29. A second cylinder device 32 is provided between the strut 27 and a stationary portion to move the beam 23 to and from the formwork 1. At least two of the plurality of struts 27 are connected to the cylinder devices 32 respectively in the longitudinal direction of the beam 23. The first and second cylinder devices 26 and 32 may be replaced by other known expandable devices.

The C-shaped frame 21 has a lower end fixed to an outer cylinder of a cylinder device 33. An end of a third piston rod 33a is movable towards a lower face an upper end of the C-shaped frame 21. Accordingly, both the first and second protruding pieces 4 and 5 can be clamped between the end of the third piston rod 33a and the upper end of the C-shaped frame 21. Specifically, the lower face of the upper end of the C-shaped frame 21 abuts against the clamping force applying portion 15 of the second protruding piece 5. The third piston rod 33a of the third cylinder device 33 abuts against the clamping force applying portion 14 of the first protruding pieces 4. This effects a clamp of both the first and second protruding pieces 4 and 5. In this respect, the cylinder device 33 constitutes a first pressing machine. The vertical movement of the C-shaped frame 21 is absorbed by deformation of the springs 25. At the time of clamping of both the protruding pieces 4 and 5, the C-shaped frame 21 is secured to both the first protruding piece 4 and the second protruding piece 5 by the cylinder device 33.

The upper end of the C-shaped frame 21 has fixed thereto an outer cylinder of a cylinder device 34, which is expandable in the horizontal direction. A fourth piston rod 34a is movable towards the engaging force applying portion 18 of the forward upright member 16. Accordingly, when the fourth piston rod 34a presses the upright member 16, the lock piece 13 is engaged with the head 9 of the tension member 6. This cylinder device 34 constitutes a second pressing machine. The reaction force due to the pressing by the fourth piston rod 34a is received by both the first and second protruding pieces 4 and 5 to which the C-shaped frame 21 is fixed through the cylinder device 33.

The clamping mechanism and the operating mechanism constitute the clamping apparatus.

Figure 9:
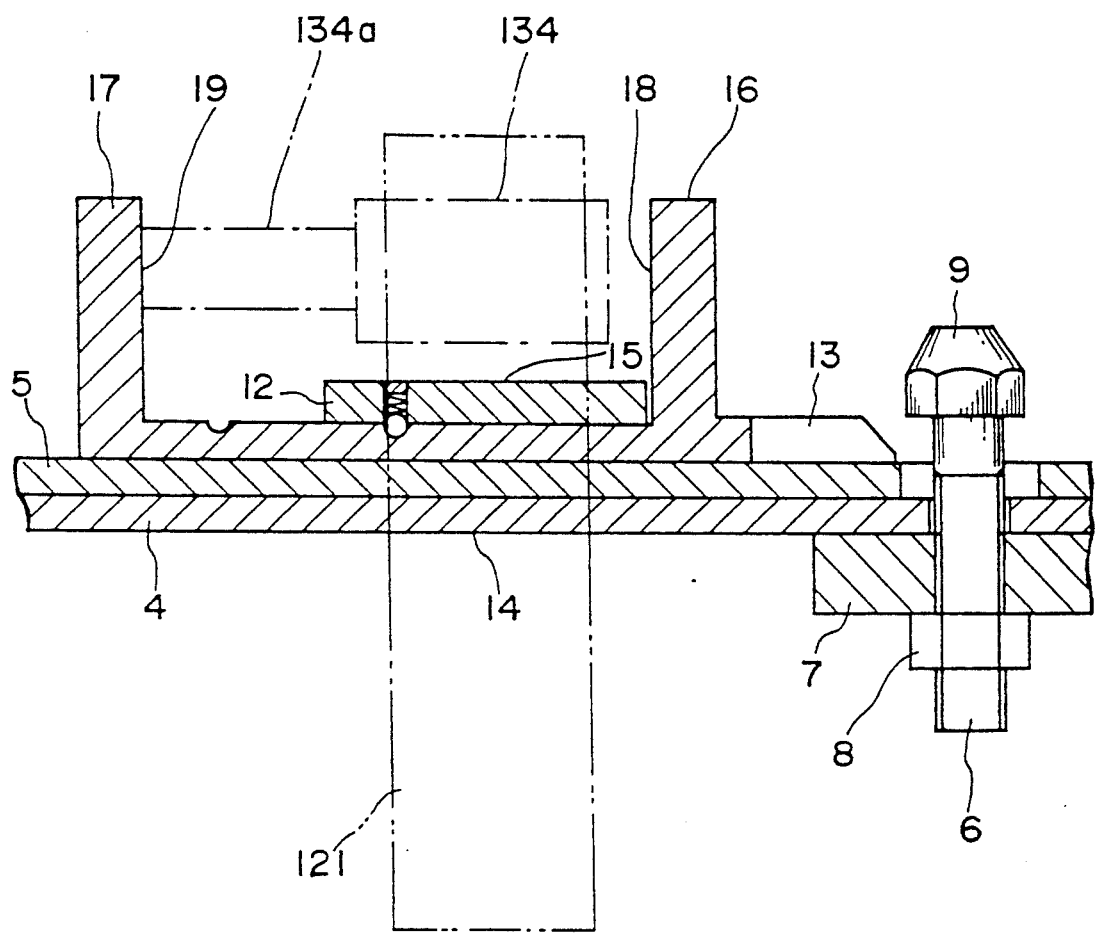
FIG. 9 is a sectional view of the clamp released condition of the formwork clamping mechanism.

FIG. 9 shows a clamp releasing mechanism used to separate the lower and upper molds 2 and 3 of the formwork 1. It is disposed at a position at which the lower and upper molds are separated in a manufacturing process of a molded product. The clamp releasing mechanism includes a C-shaped frame 121, which is the same as the above-described C-shaped frame 21, and a cylinder device 134, whose piston rod protrudes in an opposite direction to that of the fourth cylinder device 34 described in the foregoing. The piston rod 134a of the cylinder device 134 presses the disengaging force applying portion 19 of the upright member 17 which is integral with the movable member 11. Struts and other members for supporting the C-shaped frame 121 have the same structure as that shown in FIG. 7. Thus, the protruding direction of the fourth piston rod 34a of the fourth cylinder device 34 is only reversed. Thus, the clamp releasing mechanism uses the same devices and members as the operating mechanism with the exception that the protruding direction of the fourth piston rod 34a of the fourth cylinder device 34 is reversed. FIG. 9 shows a condition in which the engagement of the lock piece 13 is released by pressing the disengaging force applying portion 19 by the piston rod 134a.

Each of the cylinder devices 26, 32, 33, 34 and 134 is connected to a fluid pressure supply source through a piping (not shown), as is known in the art. Either an air pressure or a liquid pressure can be used. In particular, in this embodiment, a hydraulic pressure is applied to the cylinder devices 33, 34 and 134.

As shown in FIGS. 7 and 8, the length of the strut 27 is adjusted by the first cylinder device 26 so that the C-shaped frame 21 faces both the first and second protruding pieces 4 and 5. After the height of the C-shaped frame 21 is set properly, the second cylinder device 32 is compressed to make the C-shaped frame 21 approach both the first and second protruding pieces 4 and 5. The opposing ends of the C-shaped frame 21 confront the protruding pieces 4 and 5. The control of the first and second cylinder devices 26 and 32 to perform such operations is carried out by such well known means as a manual control valve or a sequence control.

The clamping of the formwork 1 is accomplished by the expansion of the third piston rod 33a. The C-shaped frame 21 is fixed to both the protruding pieces 4 and 5. The movement of the fourth piston rod 34a of the fourth cylinder device 34 engages the movable member 11 with the tension member 6.

The fourth piston rod 34a and the third piston rod 33a simultaneously retreat to release the C-shaped frame 21. This operation is carried out independently for individual C-shaped frames 21 which are disposed along the longitudinal direction of the formwork 1. However, the timing of each operation is simultaneous because it is performed by a single control unit.

Thereafter, the piston rod of the second cylinder device 32 is expanded and each C-shaped frame 21 is moved away from the formwork 1.

As a result of the clamping apparatus, there is no need to provide a single pulling member which extends along the longitudinal direction of the formwork 1. Therefore, no hole need be formed in the protruding member which is continuous along a circumferential direction on the peripheral surface of the formwork, such as a ring, so-called "tire", used for centrifugal casting or a reinforced rib. Thus, there is no risk of degrading the strength of the formwork 1.

By virtue of the separate clamping areas along the formwork 1, the tension members 6 can be provided close to the protruding members such as the ring 10 and the reinforcing rib. As shown in FIG. 1, the ring 10 is flanked by tension members 6 on either side. Each locking piece 13 faces forwardly toward the ring 10, for easy assembly and disassembly. Depending on the direction of movement, it is only required to change the direction of the cylinder device 34 constituting the second pressing machine.

Since the direction of movement for engagement of each lock piece 13 can be set individually, there exists great freedom of selection for positioning. For example, the tension members 6 are disposed at equal intervals along the longitudinal direction of the formwork 1 for uniform clamping. When concentrated clamping force at a position is desired, the interval of the tension members 6 can be decreased.

Since each clamping arrangement is independent, examination of one does not depend on the other clamps. Therefore, maintenance and inspection is simplified.

When the lock piece 13 is slanted so that it functions as a wedge, the clamping force due to the wedge function will be added to the clamping force applied to the clamping force applying portions 14 and 15. It is preferable that the force due to the wedge function be only a small part of the whole clamping force required. The clamping by the clamping force applying portions 14 and 15 is not released by the retreat of the third piston rod 33a and the lock piece 13 is in contact with the head 9.

Figure 10:
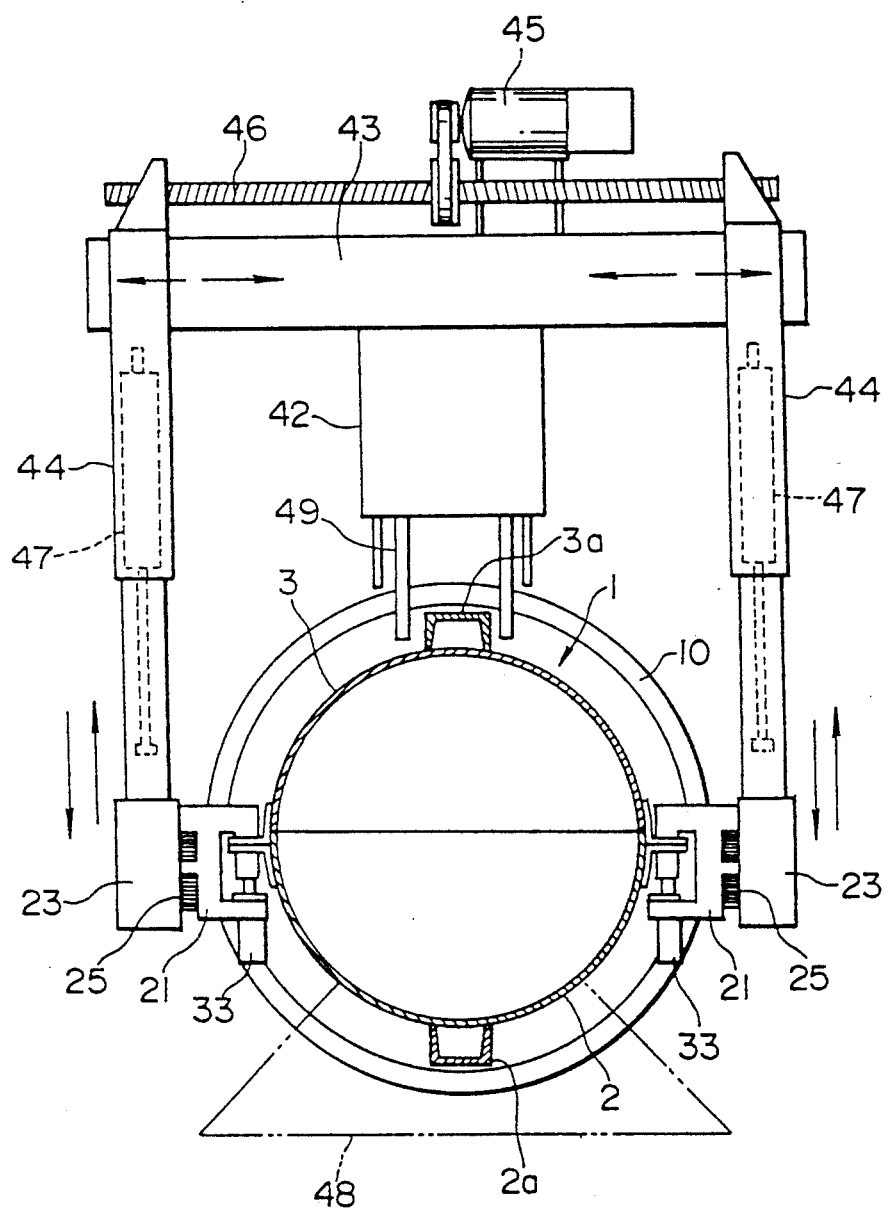
FIG. 10 is a front view showing an alternate embodiment of the operating mechanism.
Figure 11:
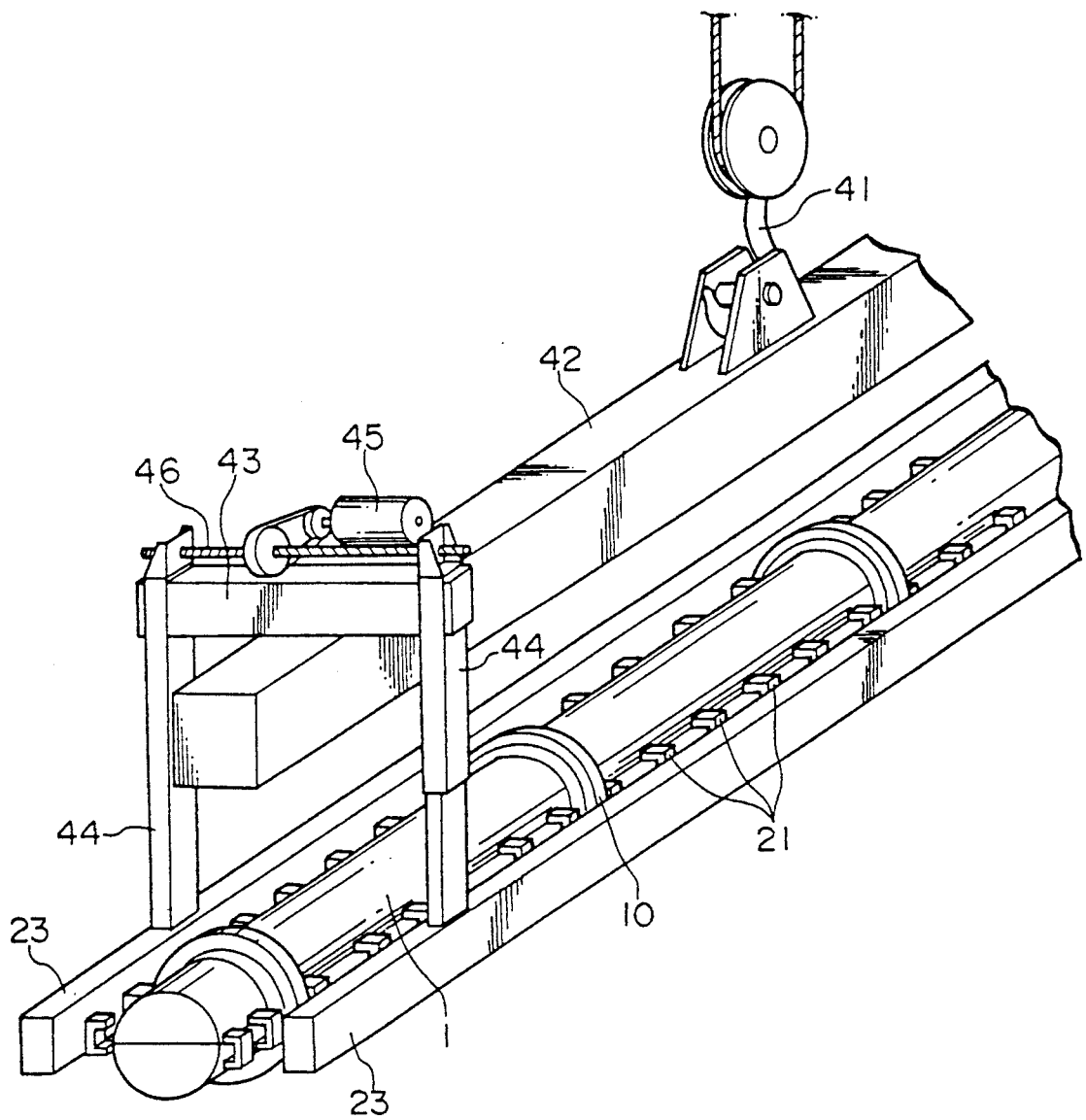
FIG. 11 is a perspective view of the alternate embodiment of the operating mechanism.

FIGS. 10 and 11 show another embodiment of the operating mechanism in which beams 23 are suspended. A main beam 42, suspended by a hook 41 of an overhead travelling crane (not shown) or the like, is positioned above and in parallel with the formwork 1 longitudinally. A plurality of lateral beams 43 are supported by the main beam 42 of positions along the longitudinal direction of the formwork 1. At opposite ends of each lateral beam 43, there are supported two arms 44 which are extensible to reach both lateral sides of the formwork 1. The two arms 44 are engaged with opposite ends of a threaded rod 46 which has two parts divided by the longitudinal center so that the two parts are threaded in opposite directions to each other. The threaded rod 46 is rotated by a motor 45 and the interval between the two arms 44 is changed depending on a direction of rotation of the motor 45 in a forward or reverse direction. Each of the arms 44 has a telescopic structure to be extensible by a built-in cylinder 47.

The beams 23 respectively fixed to the other ends of the two arms 44 are allowed to reach the height of both the first and second protruding pieces. The beams 23 can move towards and away from the formwork 1 in a similar manner as in the previous embodiment.

In FIG. 10, the reference numeral 48 denotes a base for mounting the formwork 1. The base 48 supports the formwork 1 at the clamping position, which is moved together with the main beam 42 by being gripped by a grip device 49.

Figure 6:
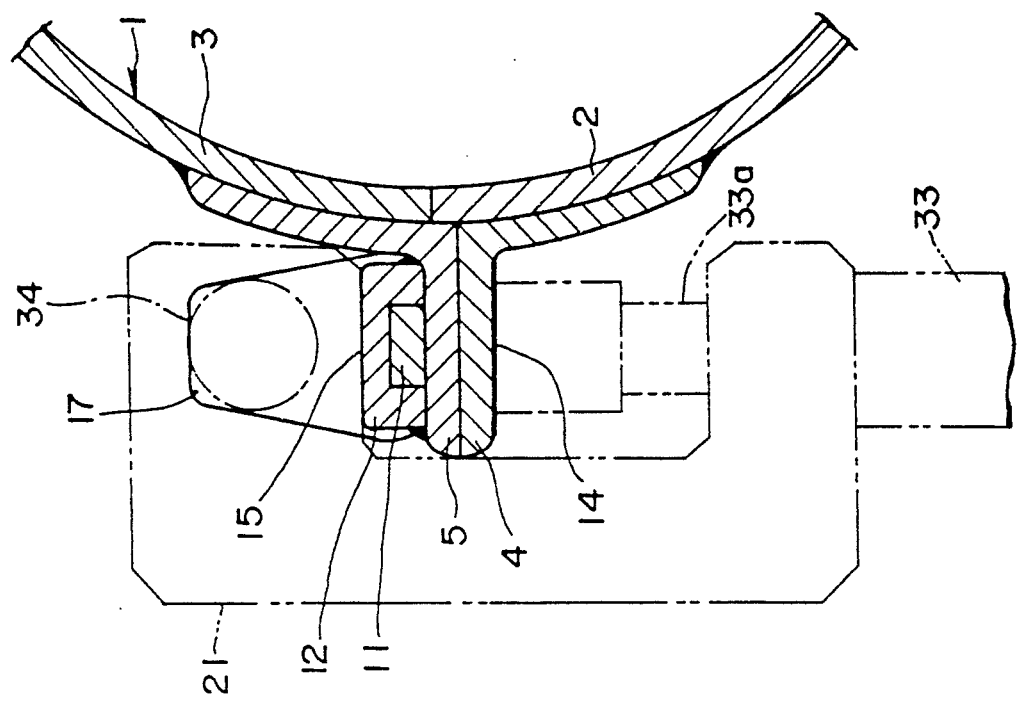
FIG. 6 is a sectional view taken along the line VI—VI in FIG. 3.
Figure 5:
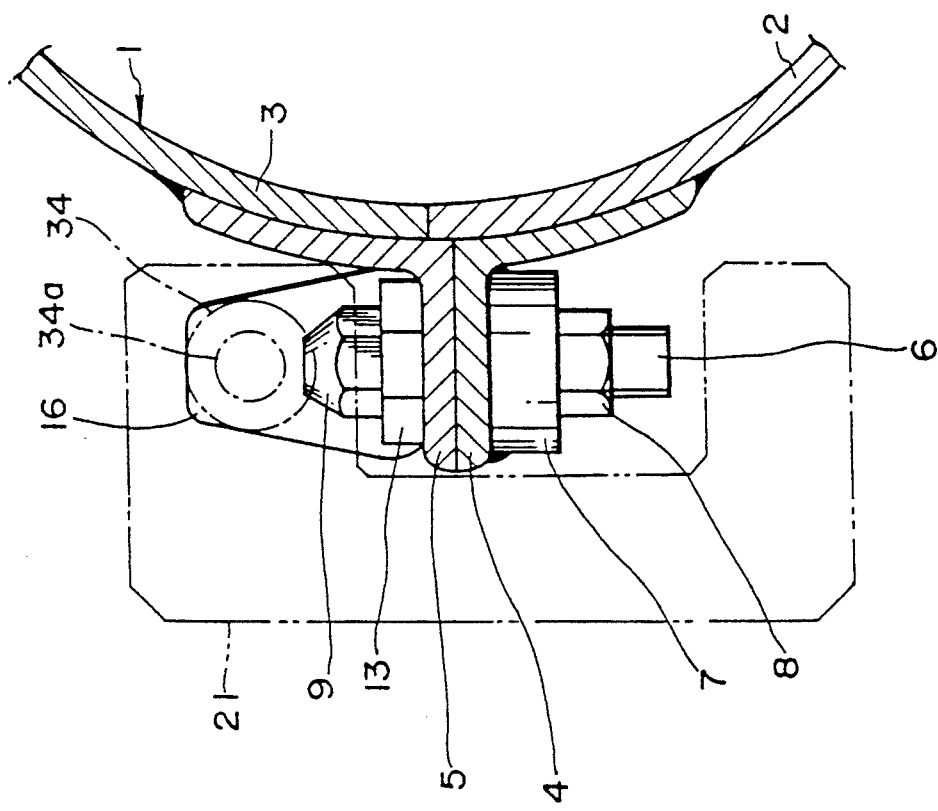
FIG. 5 is a sectional view taken along the line V—V in FIG. 3.

Molds 2 and 3 may be reversed by benefit of the design of the above embodiments. In this case, each member shown in FIGS. 3, 5 and 6 are also reversed.

Although the formwork 1 is shown as long and cylindrical, the formwork 1 and its constituent parts are not limited to these parameters, i.e. they may be short, noncylindrical, etc.

As previously described, the position and direction of the means for clamping the formwork and the position and direction of applying the means for clamping are separated from each other. Further, a plurality of sets each including the tension member and corresponding clamping force applying portion and the engaging force applying portion are made independent of each other. Therefore, each tension member may be disposed at an optimum position along the protruding pieces of the formwork. There is no fear of causing an extension between continuous wedges and causing insufficient clamping force partially as previously encountered in the art.

It is possible to apply the clamping force to the formwork and the engaging force of the lock piece in a most effective direction individually and reliably. Accordingly, the frictional loss of power is small and the wear and deformation of the formwork clamping mechanism can be prevented. Further, since the operating mechanism applies forces individually to a plurality of independent clamping arrangements, a long continuous member extending along the formwork is not necessary. Thus, there is no need to form a hole in the protruding member, such as a ring for rotating the formwork and a reinforcing rib. Thus, it is possible without these structures to insure the strength of the formwork. Further, the clamping of the formwork becomes uniform and reliable, and the maintenance and inspection is easy.

What is claimed is:

1. A formwork clamping apparatus for clamping opposed first and second protruding pieces which are provided separately to a pair of upper and lower molds, said upper and lower molds forming a formwork, said clamping mechanism comprising:

(a) a plurality of pairs of clamping force applying portions formed along joining edges of said formwork, each pair of clamping force applying portions being formed respectively at opposite sides of said first and second protruding pieces, said upper and lower molds being clamped by applying forces opposing to each other to said pair of clamping force applying portions;

(b) a plurality of tension members formed on said first protruding piece to protrude vertically along the joining edges of said formwork, said tension members respectively penetrating through holes respectively formed in said second protruding piece, each of said tension members having a head portion at an end thereof protruding beyond said second protruding piece;

(c) a plurality of lock pieces provided independently and movably on an upper surface of said second protruding piece, each of said lock pieces being adapted to move and engage between a lower surface of the head portion and the upper surface of said second protruding piece to maintain a clamped condition of said first and second protruding pieces;

(d) a plurality of engaging force applying portions independently formed on said plurality of lock pieces, each of said lock pieces being moved to an engaging position between the lower surface of the head portion and the upper surface of said second protruding piece when an engaging force is applied to a corresponding engaging force applying portion;

(e) a plurality of disengaging force applying portions independently formed on said plurality of lock pieces, each of said lock pieces being moved to a disengaged position when a disengaging force is applied to a corresponding disengaging force applying portion;

(f) a plurality of C-shaped frames each having opposing ends respectively facing first and second protruding pieces formed respectively on said pair of lower and upper molds constituting a formwork;

(g) a first pressing machine held by the opposing ends of said each C-shaped frame for applying said clamping forces to said clamping force applying portions respectively formed on said first and second protruding pieces, said C-shaped frame being fixed to said first and second protruding pieces by the clamping forces;

(h) a second pressing machine supported by each of said C-shaped frames for moving one of said lock pieces provided on said second protruding piece to the engaging position to maintain a clamped condition of said first and second protruding pieces;

(i) a beam extending along a longitudinal direction of said formwork for supporting said plurality of C-shaped frames; and (j) a moving machine for moving said beam toward and away from said formwork.

2. A formwork clamping mechanism for clamping first and second protruding pieces which are opposing to each other and provided separately to a pair of upper and lower molds, said upper and lower molds forming a formwork, said clamping mechanism comprising:

(a) a plurality of pairs of clamping force applying portions formed along joining edges of said formwork, each pair of clamping force applying portions being formed respectively at opposite sides of said first and second protruding pieces, said upper and lower molds being clamped by applying forces opposing to each other to said pair of clamping force applying portions;

(b) a plurality of tension members formed on said first protruding piece to protrude vertically along the joining edges of said formwork, said tension members respectively penetrating through holes respectively formed in said second protruding piece, each of said tension members having a head portion at an end thereof protruding beyond said second protruding piece;

(c) a plurality of lock pieces provided independently and movably on an upper surface of said second protruding piece, each of said lock pieces being adapted to move and engage between a lower surface of the head portion and the upper surface of said second protruding piece to maintain a clamped condition of said first and second protruding pieces;

(d) a plurality of engaging force applying portions independently formed on said plurality of lock pieces, each of said lock pieces being moved to an engaging position between the lower surface of the head portion and the upper surface of said second protruding piece when an engaging force is applied to a corresponding engaging force applying portion; and (e) a plurality of disengaging force applying portions independently formed on said plurality of lock pieces, each of said lock pieces being moved to a disengaged position when a disengaging force is applied to a corresponding disengaging force applying portion.

* * * * *